(12) United States Patent
Lee

(10) Patent No.: US 9,975,608 B2
(45) Date of Patent: May 22, 2018

(54) ECO-FRIENDLY BUOY

(71) Applicant: SHIN MYUNG CO., LTD., Jeollanam-do (KR)

(72) Inventor: Je Yeon Lee, Jeollanam-do (KR)

(73) Assignee: SHIN MYUNG CO., LTD., Jeollanam-Do (KR)

(*) Notice: Subject to any disclaimer, the term of this patent is extended or adjusted under 35 U.S.C. 154(b) by 0 days. days.

(21) Appl. No.: 14/894,125

(22) PCT Filed: Jun. 24, 2015

(86) PCT No.: PCT/KR2015/006415
§ 371 (c)(1),
(2) Date: Nov. 25, 2015

(87) PCT Pub. No.: WO2016/047896
PCT Pub. Date: Mar. 31, 2016

(65) Prior Publication Data
US 2017/0106947 A1     Apr. 20, 2017

(51) Int. Cl.
*B63B 22/00* (2006.01)
*B29C 44/02* (2006.01)
*B29C 44/34* (2006.01)
*B29K 23/00* (2006.01)
(Continued)

(52) U.S. Cl.
CPC ............... *B63B 22/00* (2013.01); *B29C 44/02* (2013.01); *B29C 44/3415* (2013.01); *B29K 2023/06* (2013.01); *B29K 2023/12* (2013.01); *B29K 2105/04* (2013.01); *B29L 2031/706* (2013.01); *B63B 2231/50* (2013.01)

(58) Field of Classification Search
CPC . B63B 22/00; B63B 2231/50; B29C 44/3415; B29C 44/02; B29L 2031/706; B29K 2105/04; B29K 2023/06; B29K 2023/12
See application file for complete search history.

(56) References Cited

FOREIGN PATENT DOCUMENTS

IN   201002730 I1 * 12/2010
JP   56028849 A  *  3/1981
JP   58171924 A  * 10/1983   ......... B29C 44/0407
(Continued)

OTHER PUBLICATIONS

English translation of JP 56028849.*
(Continued)

*Primary Examiner* — Jun Yoo
(74) *Attorney, Agent, or Firm* — IPLA P.A.; James E. Bame

(57) ABSTRACT

An eco-friendly buoy includes a foam including a cylindrical accommodation space in the interior of the foam, and coupling grooves at predetermined intervals at an outer surface circumference of the foam in order to fasten the foam to fixing members through wire; and a protective layer formed on an entire outer surface of the foam and protecting the foam from damage by waves or wind. The eco-friendly buoy is manufactured from eco-friendly expanded polypropylene and expanded styrene and has a protective layer on an outer surface thereof, thereby being protected from damage by waves or wind. In addition, the eco-friendly buoy may be used for a long time, thus reducing maintenance costs.

1 Claim, 8 Drawing Sheets

(51) Int. Cl.
 *B29K 105/04* (2006.01)
 *B29L 31/00* (2006.01)

(56) References Cited

FOREIGN PATENT DOCUMENTS

| | | | | |
|---|---|---|---|---|
| JP | 2004242653 | | | 9/2004 |
| KR | 100377231 | A | * | 3/2003 |
| KR | 2003897440000 | | | 7/2005 |
| KR | 1020110013095 | | | 2/2011 |
| KR | 101246931 | A | * | 1/2012 |
| KR | 1020130004220 | | | 1/2013 |

OTHER PUBLICATIONS

English translation of JP 58171924.*
English translation of KR 101246931.*
English translation of KR 100377231.*

* cited by examiner

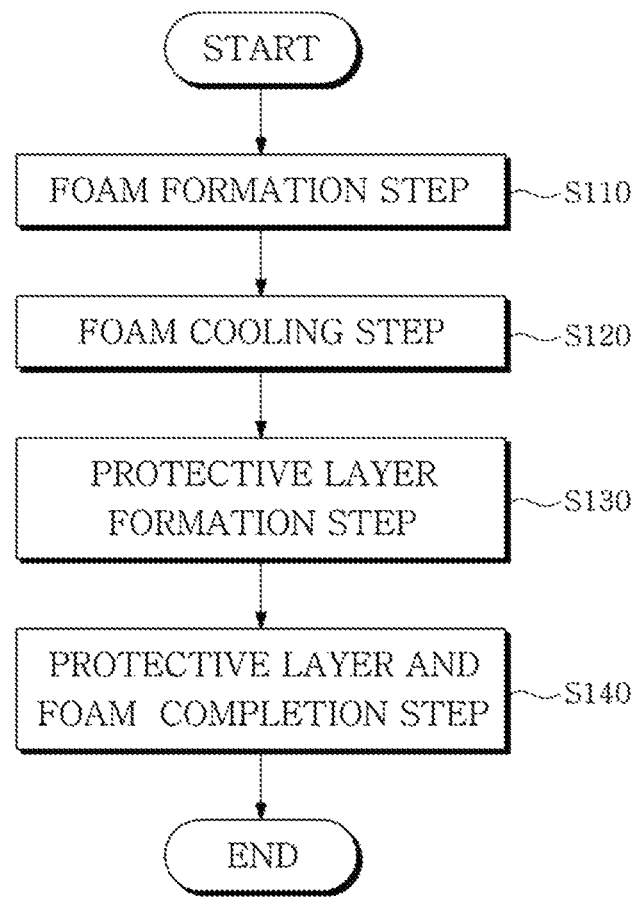

ECO-FRIENDLY BUOY

BACKGROUND

The present invention relates to an eco-friendly buoy, and more particularly to an eco-friendly buoy configured to be protected from damage by waves or wind.

In general, case culturing means raising specific fish in a net installed in a certain area of inland waters such as lakes behind dams. Such case culturing is recently performed on costalines due to water quality deterioration concerns.

General facilities for case culturing are constructed by forming a ladderlike passage with wood or synthetic resin and then installing a plurality of buoys, spaced apart from one another, at a lower portion of the passage, followed by installing a net in the interior of the passage.

Here, such buoy is formed by winding the outer circumference surface of a cylindrical Styrofoam body with gunny fabric and fixed to the passage by means of a string, thus having resistance to applied loads.

However, conventional buoys are easily worn or broken by waves or wind since they are made of Styrofoam, whereby frequent replacement is required and economic loss thus increases.

In addition, fragments from damaged buoys cover the sea surface, thus causing seawater pollution as well as spoiling the ocean view.

SUMMARY OF THE INVENTION

Therefore, the present invention has been made in view of the above problems, and it is an object of the present invention to provide a buoy that is manufactured with eco-friendly expanded polypropylene and expanded styrene, and has a protective layer formed on an outer surface thereof such that the buoy is protected from damage by waves or wind.

It is another object of the present invention to provide a buoy including ribs in an interior space thereof such that the buoy is resistant to external force transferred through waves or wind.

It is yet another object of the present invention to provide a buoy including a protective layer that can be simply formed on an outer surface of the buoy by controlling the temperature of a mold without an additional device.

In accordance with the present invention, the above and other objects can be accomplished by the provision of an eco-friendly buoy including: a foam including a cylindrical accommodation space in an interior of the foam, and coupling grooves at predetermined intervals at an outer surface circumference of the foam in order to fasten the foam to fixing members through wires; and a protective layer formed on an entire outer surface of the foam and protecting the foam from damage by waves or wind.

Ribs may be formed at predetermined intervals in an accommodation space of the foam.

In accordance with another aspect of the present invention, there is provided a method of manufacturing the eco-friendly buoy, the method including: foam formation of forming a form by supplying expanded polypropylene or foamed polyethylene to an interior of a mold forming a cylindrical shape and then supplying heat from a heater to the mold; foam cooling of cooling the foam formed in the mold by cooling the mold; protective layer formation of forming a protective layer by melting an outer surface of the foam through supplying of heat from the heater to the mold including the foam; and protective layer and foam completion of completing the protective layer and the foam by cooling the mold.

In accordance with another aspect of the present invention, there is provided another method of manufacturing the eco-friendly buoy, the method including: foam formation of forming foams by supplying expanded polypropylene or foamed polyethylene to interiors of molds forming a semi-cylindrical shape and then supplying heat from a heater to the molds; foam cooling of cooling the foams formed in the molds by cooling the molds; protective layer formation of forming protective layers melting outer surfaces of the foams through supplying of heat from the heater to the molds including the foams; protective layer and foam completion of completing the protective layers and the foams by cooling the molds; and assembly of fixing through thermosetting after adhering connection parts of a pair of the foams and a pair of protective layers formed in a semicylindrical shape.

Inner support member insertion of inserting inner support members made of expanded polystyrene into accommodation spaces of the foams may be added between the protective layer and foam formation and the assembly.

In the forming protective layer(s), the mold(s) may be rotated and the heater(s) may supply heat to the mold(s) at a predetermined section to sequentially form protective layer(s) at the outer surface(s) of the foam(s).

According to an embodiment of the present invention, a buoy is manufactured with eco-friendly expanded polypropylene and expanded styrene, and has a protective layer on an outer surface thereof such that the buoy is protected from damage by waves or wind. In addition, the buoy can be used for a long time, thereby reducing costs.

In addition, the buoy includes ribs in an interior space thereof, thus having resistance to external force transferred through waves or wind. In addition, the buoy can be used for a long time, thereby reducing costs.

Furthermore, a protective layer can be formed on an outer surface of the buoy by controlling temperature without an additional device, thereby increasing productivity.

BRIEF DESCRIPTION OF DRAWINGS

The above and other objects, features and other advantages of the present invention will be more clearly understood from the following detailed description taken in conjunction with the accompanying drawings, in which:

FIGS. 4 to 7 illustrate processes of manufacturing the eco-friendly buoy according to the present invention;

DETAILED DESCRIPTION OF THE INVENTION

Figure 1:
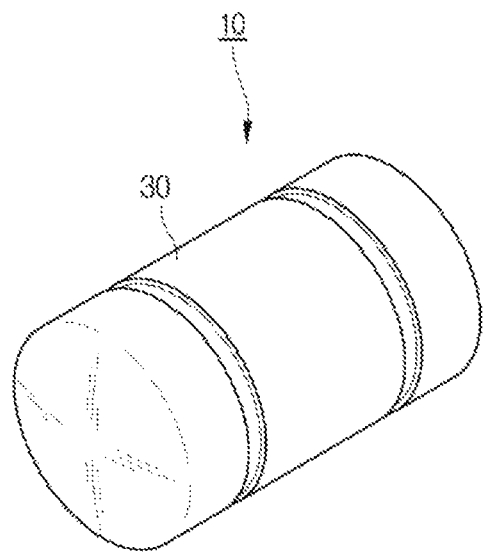
FIG. 1 illustrates a perspective view of an eco-friendly buoy according to the present invention.

The present invention will now be described more fully with reference to the accompanying drawings, in which exemplary embodiments of the invention are shown. The invention may, however, be embodied in many different forms and should not be construed as being limited to the embodiments set forth herein. Like reference numerals in the drawings denote like elements.

Figure 2:
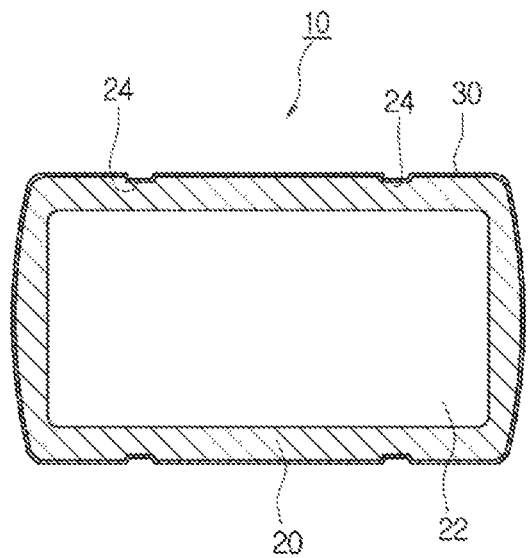
FIG. 2 illustrates a sectional view of the eco-friendly buoy according to the present invention.
Figure 3A:
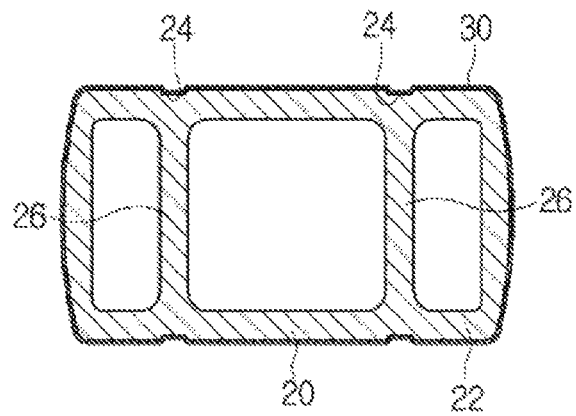
FIGS. 3A to 3C illustrate sectional views of eco-friendly buoys according embodiments of the present invention.
Figure 3B:
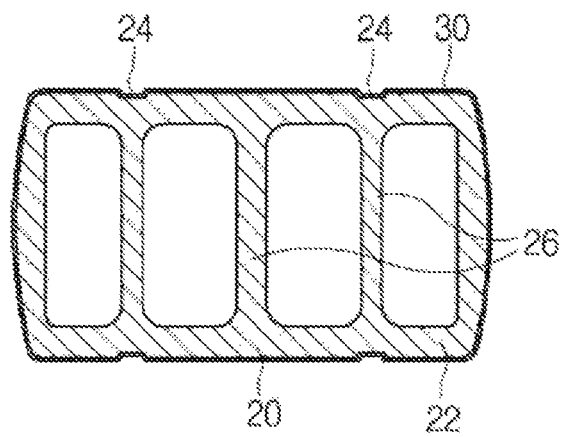
Figure 3C:
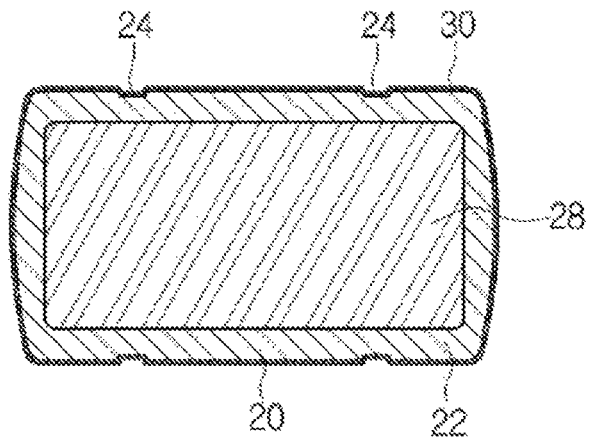

Hereinafter, a configuration of the present invention will be described with reference to the accompanying drawings. FIG. 1 illustrates a perspective view of an eco-friendly buoy according to the present invention, FIG. 2 illustrates a sectional view of the eco-friendly buoy according to the present invention, FIGS. 3A to 3C illustrate sectional views of eco-friendly buoys according to embodiments of the present invention, FIGS. 4 to 7 illustrate processes of manufacturing the eco-friendly buoy according to the present invention, and FIGS. 8A and 8B illustrate formation of a protective layer on a foam according to the present invention.

An eco-friendly buoy 10 according to the present invention is broadly divided into a foam 20 having a desired size and a protective layer 30 formed on an entire outer surface of the foam 20.

The foam 20 has a cylindrical accommodation space 22 in the interior thereof, and coupling grooves 24 spaced apart in a longitudinal direction of an outer surface thereof such that the outer surface of the foam 20 is fixed to fixing members 50 by means of wires 40.

Here, the foam 20 is made of expanded polypropylene, foamed polyethylene, or the like being bead foam and having superior impact resistance and durability.

That is, the foam 20 is formed using buoyant expanded polypropylene or foamed polyethylene and then is fixed to the fixing members 50 provided along a moving path of workers and the wires 40.

In this case, the foam 20 may be formed in a variety of shapes such as a quadrangle, an oval or a polygon, other than the cylindrical shape illustrated in the figures.

In addition, ribs 26 are formed at predetermined intervals in the accommodation space 22 so that the foam 20 is fixed against waves or wind while being protected from damage by waves or wind.

Here, the ribs 26 may be formed at predetermined intervals in a longitudinal direction inside the foam 20 as illustrated in FIG. 3A or 3B, or at predetermined intervals in a horizontal direction.

The protective layer 30, which is formed on an entire outer surface of the foam 20, has a predetermined thickness.

That is, the protective layer 30 is formed on the entire outer surface of the foam 20, thus protecting the foam 20 from damage by waves, wind, etc.

In addition, in the present invention, the protective layer 30 may be integrally formed with the foam 20. Alternatively, the protective layer 30 and the foam 20 may be separately manufactured, followed by coupling.

This will be described in more detail. The protective layer 30 may be formed, after inserting the foam 20 completed into a mold 60, by supplying heat from a heater 70 to the mold 60 to melt the foam 20 to a predetermined thickness. Alternatively, the foam 20 and the protective layer 30 may be separately formed and then fastened by a method such as thermosetting.

Next, processes of manufacturing the eco-friendly buoy 10 will be described with reference to FIGS. 4 to 7

Figure 5:
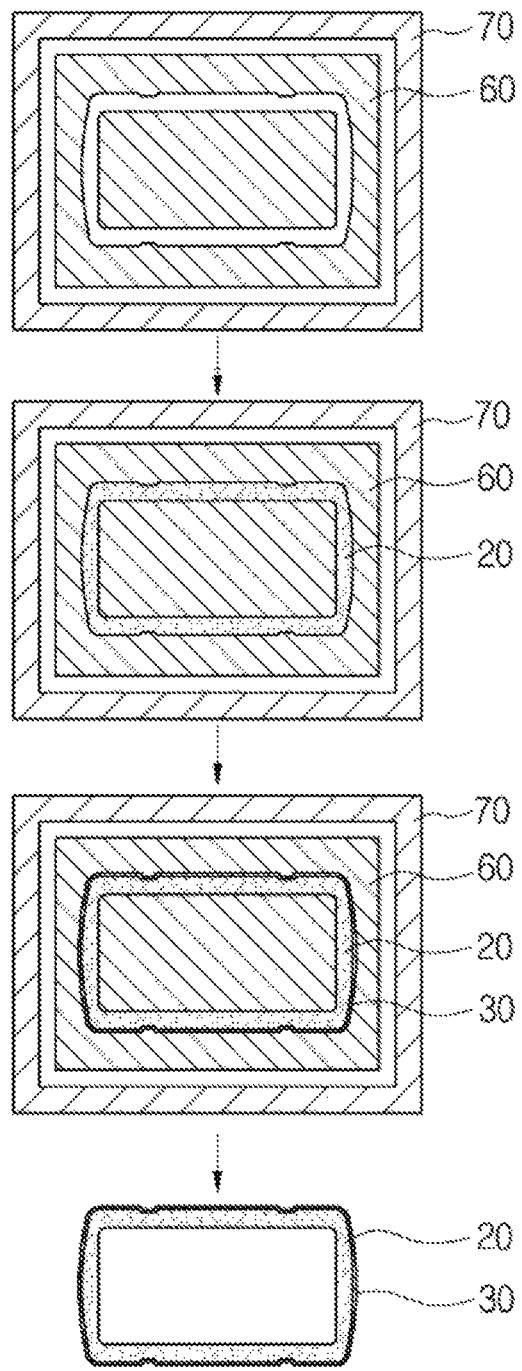

First, in the case of FIGS. 4 and 5, a method of manufacturing the eco-friendly buoy 10 includes a foam formation step (S110) of forming a foam 20 by supplying heat from the heater 70 to the mold 60 after supplying expanded polypropylene or foamed polyethylene to the interior of the mold 60 with a cylindrical shape, a foam cooling step (S120) of cooling the foam 20 formed in the interior of the mold 60 by cooling the mold 60, a protective layer formation step (S130) of forming the protective layer 30 by melting an outer surface of the foam 20 through heating of the mold 60 including the foam 20, and a protective layer and foam completion step of completing the protective layer 30 and the foam 20 by cooling the mold 60.

That is, the protective layer 30 of the eco-friendly buoy 10 is formed by cooling the foam 20 and then melting an outer surface of the foam 20 through heating of the mold 60, after supplying expanded polypropylene or foamed polyethylene to the interior of the mold 60 forming a cylindrical shape and then supplying heat from the heater 70 to the mold 60 to form the foam 20.

In this case, the mold 60 for heating the foam 20 completed may be the mold used to form the foam 20 or a separate mold.

Figure 6:
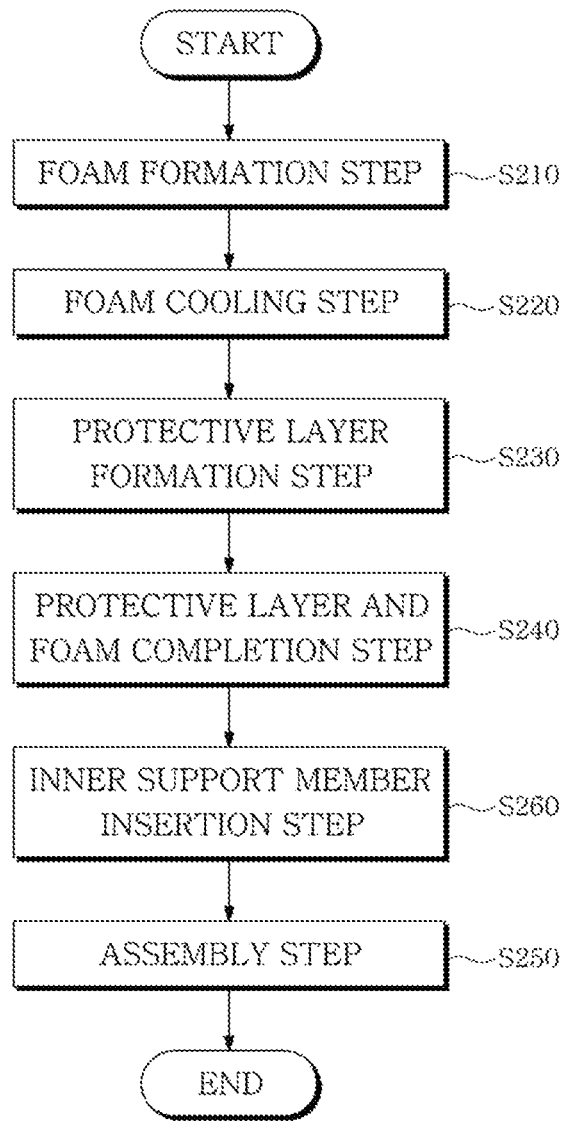
Figure 7:
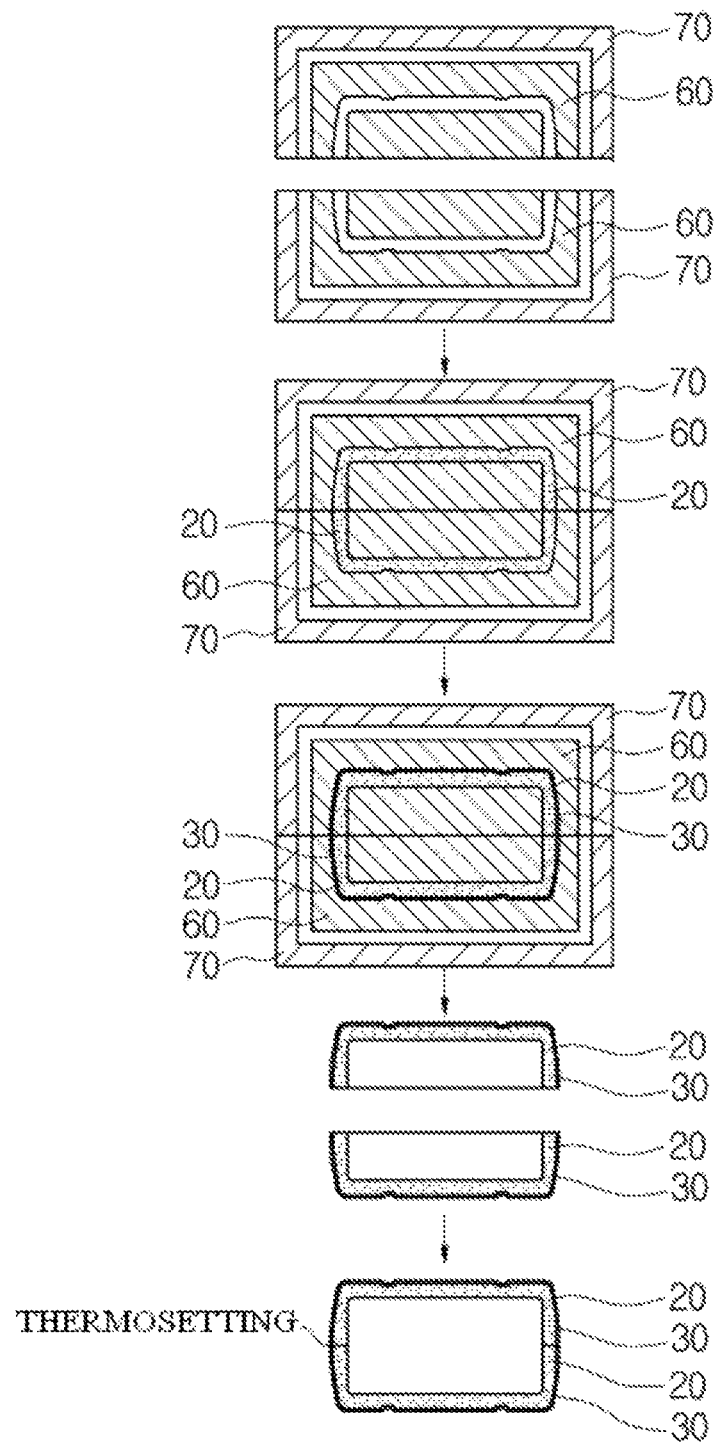
Figure 8A:
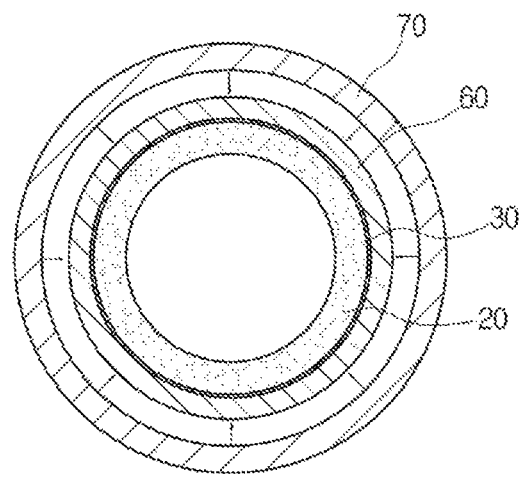
FIGS. 8A and 8B illustrate a structure of a protective layer formed on a foam according to the present invention.
Figure 8B:
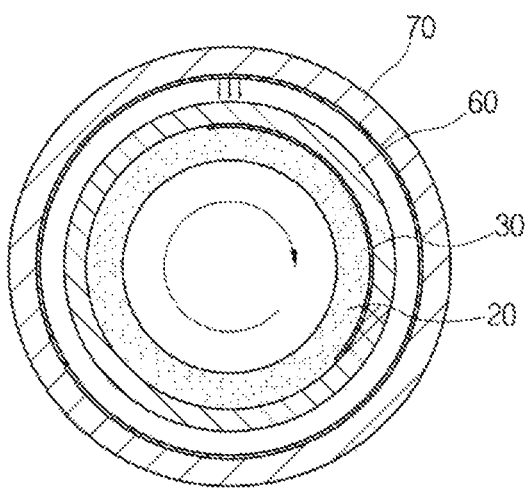
Figure 9:
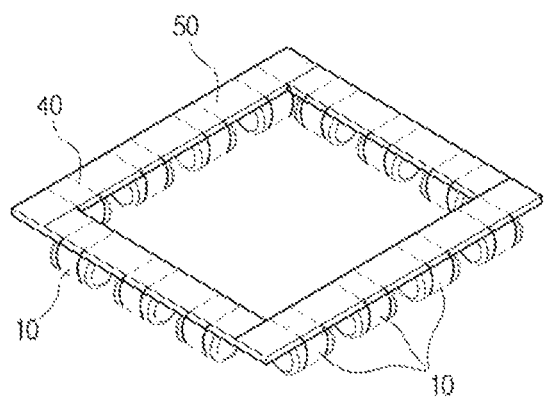
FIG. 9 illustrates an example of the eco-friendly buoy according to the present invention in use.

In the case of FIGS. 6 and 7, a method of manufacturing an eco-friendly buoy includes a foam formation step (S210) of forming foams 20 by supplying heat from heaters 70 to molds 60 after supplying expanded polypropylene or foamed polyethylene to the interiors of the molds 60 forming a semicylindrical shape, a foam cooling step (S220) of cooling the foams 20 formed in the molds 60 by cooling the molds 60, a protective layer formation step (S230) of forming protective layers 30 by melting outer surfaces of the foams 20 through heating of the molds 60 including the foams 20, a protective layer and foam formation step (S240) of forming the protective layers 30 and the foams 20 by cooling the molds 60, and a fixation step (S250) of adhering connection parts of a pair of the foams 20 and a pair of the protective layers 30 formed in a semicylindrical shape and then fixing the same through thermosetting.

That is, the eco-friendly buoy 10 is formed by, after supplying expanded polypropylene or foamed polyethylene to the interiors of the molds 60 forming a semicylindrical shape, supplying heat from the heaters 70 to the molds 60 to form the foams 20, and then melting outer surfaces of the foams 20 through heating of the molds 60 after cooling the foams 20 to form the protective layers 30, followed by fixing the connection parts of the pair of the foams 20 formed in a semicylindrical shape through thermosetting.

Here, the molds 60 for heating the foams 20 completed may be the molds used to form the foams 20 or separate molds.

In addition, an inner support member insertion step (S260) of inserting inner support members 28 manufactured from expanded polystyrene into accommodation spaces 22 of the foam 20 may be added between the form formation (S240) and the fixation (S250).

That is, the inner support members 28 manufactured from the expanded polystyrene are mounted in the accommodation spaces 22 of the foams 20, thus absorbing impact due to waves or wind while functioning as supporters.

The protective layer 30 formed on the foam 20 or each of the foams 20 will be described in more detail with reference to FIG. 8A or 8B.

First, in the case of FIG. 8A, heat from the heater 70 is supplied to the entire outer surface of the mold 60 including the foam 20 such that the protective layer 30 is formed on the outer surface of the foam 20 at one time.

That is, heat from the heater 70 is supplied to the entire surface of the mold 60 including the foam 20 such that the protective layer 30 is formed, at one time, on the outer surface of the foam 20 provided at the interior of the mold 60.

In the case of FIG. 8B, the mold 60 including the foam 20 is rotated, and heat from the heater 70 is supplied to the mold 60 at a predetermined section such that the protective layer 30 is sequentially formed on the outer surface of the foam 20.

That is, the heater 70 sequentially forms the protective layer 30 on an outer surface of the foam 20 by heating the mold 60 including the foam 20 only at a predetermined section.

An embodiment of the eco-friendly buoy constituted as described above will be described as a reference.

First, expanded polypropylene or foamed polyethylene is supplied to the interiors of molds 60 formed in a semicylindrical shape.

In addition, heat from heaters 70 is supplied to the molds 60 to form foams 20 having a semicylindrical shape. Subsequently, the foams 20 contained in the interiors of the molds 60 are cooled, and then heat from the heaters 70 are provided to outer surfaces of the molds 60 containing the foams 20 to form protective layers 30.

Next, the foams 20 including the protective layers 30 formed in a semicylindrical shape are connected and then connection parts of a pair of the foams 20 are fixed through thermosetting, resulting in completion of an eco-friendly buoy 10.

A method of using an eco-friendly buoy manufactured as described above is as follows.

First, a plurality of fixing members 50 manufactured from wood or synthetic resin and a plurality of eco-friendly buoys 10 are prepared.

The eco-friendly buoys 10 are disposed at predetermined intervals at lower portions of the fixing members 50 and then fastened using the coupling grooves 24 and the fixing members 50 by means of the wires 40.

Next, the fixing members 50 including the eco-friendly buoys 10 are disposed at a proper place. Finally, a net is installed at the interior of the fixing members 50.

Here, an order of installing the eco-friendly buoys may be different from that described above.

As such, the buoy according to the present invention is eco-friendly and includes the protective layer on an outer surface of the foam thereof. The protective layer may protect the buoy from damage by waves or wind.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of manufacturing an eco-friendly buoy, the method comprising:
   foam formation of forming foams by supplying expanded polypropylene or foamed polyethylene to interiors of molds forming a semicylindrical shape and then supplying heat from a heater to the molds;
   foam cooling of cooling the foams formed in the molds by cooling the molds;
   protective layer formation of forming protective layers melting outer surfaces of the foams through supplying of heat from the heater to the molds comprising the foams, wherein the molds are rotated and the heaters supply heat to the molds at a predetermined section to sequentially form protective layers at the outer surfaces of the foams;
   protective layer and foam formation of forming the protective layers and the foams by cooling the molds wherein the foams comprise a cylindrical accommodation space in an interior of the foams, coupling grooves at predetermined intervals at an outer surface circumference of the foams in order to fasten the foams with fixing members through wires, and the protective layer formed on an entire outer surface of the foams and protecting the foams from damage by waves or wind;
   inner support member insertion of inserting inner support members made of expanded polystyrene into accommodation spaces of the foams; and
   assembly of fixing through thermosetting after adhering connection parts of a pair of the foams and a pair of protective layers formed in a semicylindrical shape.

* * * * *